United States Patent [19]

Bertocchi et al.

[11] Patent Number: 5,353,032
[45] Date of Patent: Oct. 4, 1994

[54] CIRCUIT INCLUDING A PHASE SHIFTER FOR GENERATING SIGNALS FOR ELECTRONICALLY SCANNED ANTENNAS

[75] Inventors: Giuseppe Bertocchi, Bergamo; Paolo Mauri, Gallarate, both of Italy

[73] Assignee: Alcatel Italia S.p.A., Milan, Italy

[21] Appl. No.: 59,090

[22] Filed: May 5, 1993

[30] Foreign Application Priority Data

May 5, 1992 [IT] Italy .................. MI92 A 001075

[51] Int. Cl.$^5$ .................. H01Q 3/22; H01Q 3/24; H01Q 3/26
[52] U.S. Cl. .................. 342/373; 342/372
[58] Field of Search .................. 342/372, 373, 399; 333/138, 139, 140, 164

[56] References Cited

U.S. PATENT DOCUMENTS

| | | | |
|---|---|---|---|
| 3,568,105 | 3/1971 | Felsenheld | 333/31 |
| 3,747,102 | 7/1973 | Cooper . | |
| 4,905,012 | 2/1990 | Foti . | |
| 5,208,564 | 5/1993 | Burns et al. | 333/164 |

FOREIGN PATENT DOCUMENTS

2158649 11/1985 United Kingdom .

OTHER PUBLICATIONS

19th European Microwave Conference, Sep. 1989, London, GB pp. 959–965, Foti et al "An Intelligent Electronically Spinning Tacan Antenna".
AP–S International Symposium on Antennas and Propagation Jun. 1985, Vancouver, Canada, pp. 115-119 Greving et al, "An Optimized Circular Array-Application to the Tacan System".
Microwaves & RF, May 1989, pp. 194, 196, 199, and 201–203, MacNamara et al, "Stripline Network Drives 32 Elements to Wide Bandwidths".
K. H. Hering, "The Design of Hybrid Multiple Beam Forming Networks", pp. 240-268, Phased-Array Antennas, TRW Systems Group.
Barry K. Watson, "Product Range, RF Products", Aug. 1987, p. 29, ERA Technology Limited.

*Primary Examiner*—Theodore M. Blum
*Attorney, Agent, or Firm*—Frishauf, Holtz, Goodman & Woodward

[57] ABSTRACT

A circuit generates RF signals for electronically scanned antennas and in particular for TACAN systems. The circuit includes a phase shifter that is particularly suitable for use in generating these RF signals. Instead of using circuits including a large Butler-matrix, a small Butler-matrix having only a few outputs is used for combining a limited number of outputs of a power divider. By further combining the remaining outputs of the power divider with the few outputs of the Butler-matrix by the use of electromagnetic combiners, a plurality of RF signals that are suitable for use by electronically scanned antennas are obtained from the circuit which is comparatively simple in structure yet produces very accurately controlled RF signals.

9 Claims, 5 Drawing Sheets

CIRCUIT INCLUDING A PHASE SHIFTER FOR GENERATING SIGNALS FOR ELECTRONICALLY SCANNED ANTENNAS

BACKGROUND OF THE INVENTION

Field of the Invention

The present invention relates to a circuit for generating RF signals for electronically scanned antennas and in particular for TACAN systems and to a phase shifter that is especially suitable for use in such a circuit.

Description of the Prior Art

In the field of NAVAID equipment, electronically scanned antennas have been used for some time in place of mobile antennas. A scanning effect of the RF signal is obtained through use of a plurality of radiating elements of the antenna to which RF signals are fed that differ from each other and can have reciprocal phases and amplitudes. The phase can vary continuously with time; in particular in TACAN systems such RF signals are amplitude modulated and the phase of the modulating signals varies according to a prefixed scheme.

In FIG. 1 there is illustrated the radiation pattern of a TACAN-antenna which rotates about its axis at fifteen revolutions per second. In order to obtain such a pattern the radiating elements have to generate suitable RF signals. FIG. 2 shows how the amplitude of a signal received by a fixed receiver located within the range of the TACAN-antenna changes with time.

Solutions of the problem of providing a circuit capable of generating RF signals with the necessary characteristics are known in the art for some time. Such circuits are based upon the use of the so-called Butler-matrices.

One such prior art circuit is illustrated in the article of G. Greying, R. Zeitz entitled "An Optimized Circular Array-Application to the TACAN System" appearing in AP-S International Symposium on "ANTENNAS AND PROPAGATION" Vancouver, Canada, Jun. 17–21, 1985, pages 115–118 the entire contents of which is incorporated herein by reference.

The circuit illustrated in this article is basically constituted by a power divider. At the input of the divider there is fed a sole RF signal generated by the TACAN equipment and the divider provides four outputs corresponding to the RF signal which respectively have a power equal to one fourth of the RF input power. Three of the outputs of such a power divider are fed as inputs to three electronically controlled phase shifters. The remaining output of the power divider (the one corresponding to the carrier of the signal to be emitted) and the outputs of the three phase shifters are then connected to six input RF switches of a 6×16 Butler-matrix. The outputs of the Butler-matrix are applied to sixteen radiating elements of the TACAN system antenna.

As suggested by the G. GREVING article itself, (mentioned above), such a Butler-matrix can be realized by using known techniques or it can be purchased in the open market from high frequency device vendors.

One known commercially available Butler-matrix is sold by ERA Technology Ltd., a company incorporated in Great Britain. A data sheet for the ERA "Product Range by Products" 8/87, page 29 published by ERA Technology Ltd. describes the ERA Butler-matrix. This known matrix has a conventional architecture as illustrated in the articles "Stripline Network Drives 32 Elements to Wide Bandwidths" by T.M. Macnamara, R. Cahill, S.J. Foti published in Microwaves & RF, May 1989, pages 194–203 and by the article by K.H. Hering, entitled "The Design of Hybrid Multiple Beam Forming Networks" pages 240–268 published in Phased-Array Antennas, TRW Systems Group.

The Butler-matrix disclosed in the Macnamara article is a 32×32 matrix and it is based on a tree regular architecture composed of 90 degree and 180 degree hybrid matrices and fixed phase shifters, in particular Shiffman-frequency compensated differential phase shifters. Moreover, there is illustrated in the Macnamara article the possibility of simplifying the matrix structure in those cases when a particular application does not require all the inputs, (e.g. it only requires eight inputs).

Such big Butler-matrices are expensive, difficult to implement and introduce errors in both insertion loss and the SWR (Standing-Wave Ratio) at the inputs of the radiating elements; in particular the latter is worsened by the frequency-compensated differential phase-shifters.

SUMMARY OF THE INVENTION

It is an object of the present invention to provide a circuit capable of generating RF signals with a characteristic necessary for electronically scanned antennas which overcomes the drawbacks of the prior art and, more specifically, is simpler than the prior art and introduces less errors.

This object is reached through a circuit for generating RF signals for an electronically scanned antenna, and in particular is to be applied to a TACAN system antenna, and by use of a phase shifter specifically suitable for such a circuit.

The present invention provides a small Butler-matrix to combine a limited number of outputs of a power divider and further combines the remaining outputs of the power divider, suitably phase-shifted, and combines the few outputs of the Butler-matrix through the use of electromagnetic combiners. A plurality of RF signals suitable for electronically scanned antennas is obtained which have very good precision and require relatively simple circuitry.

An improvement in the SWR is obtained by using in the present invention, phase shifters that are compensated through use of lambda/4 stubs instead of using conventional differential phase shifters that are frequency-compensated through electromagnetic coupling (Schiffman phase shifters), as will become clearer hereinafter.

The phase shifter in the present invention has a very stable shift constancy within an elevated band centered on the operating frequency of the phase shifter.

BRIEF DESCRIPTION OF THE DRAWINGS

The present invention will be more apparent from the following description taken in conjunction with the attached drawings in which.

DETAILED DESCRIPTION

Figure 1:
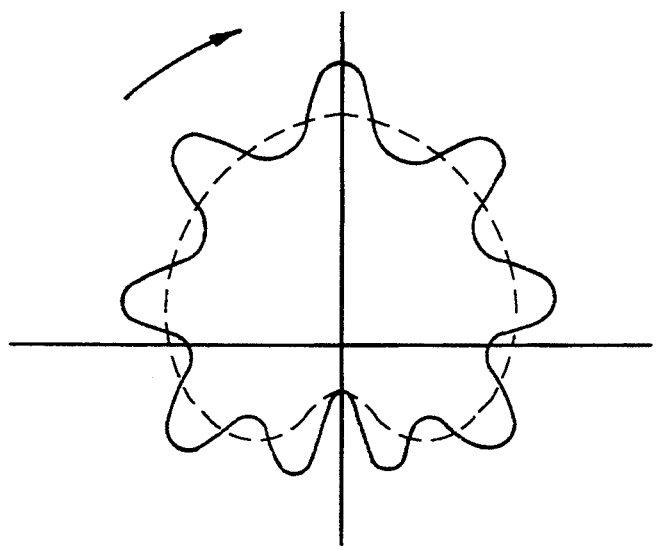
FIG. 1 shows the radiation pattern of a TACAN-antenna.
Figure 2:
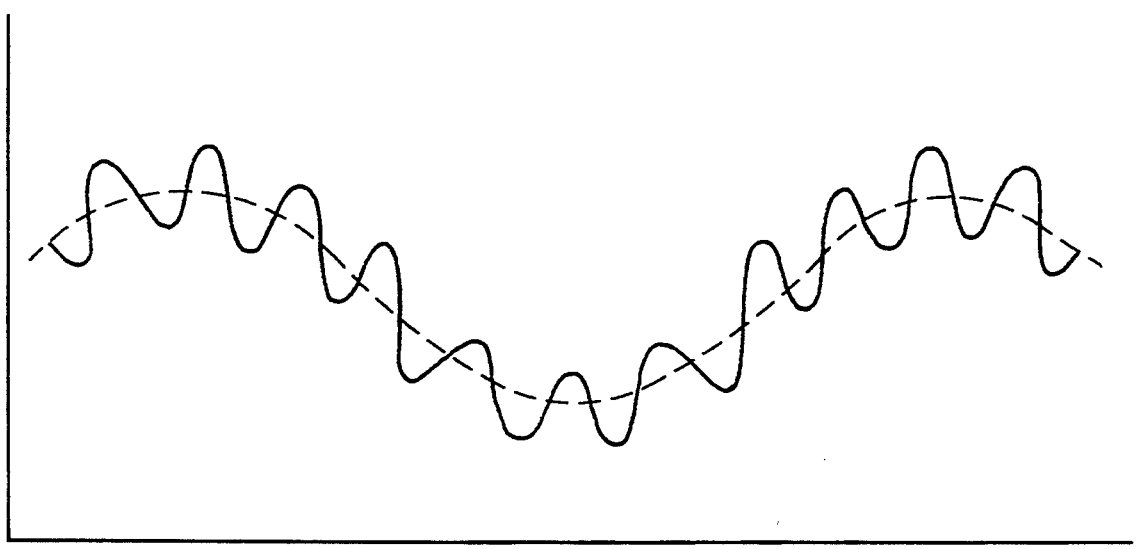
FIG. 2 shows the manner in which the amplitude of the signal received by a fixed receiver located within the range of the TACAN-antenna changes with time.
Figure 3:
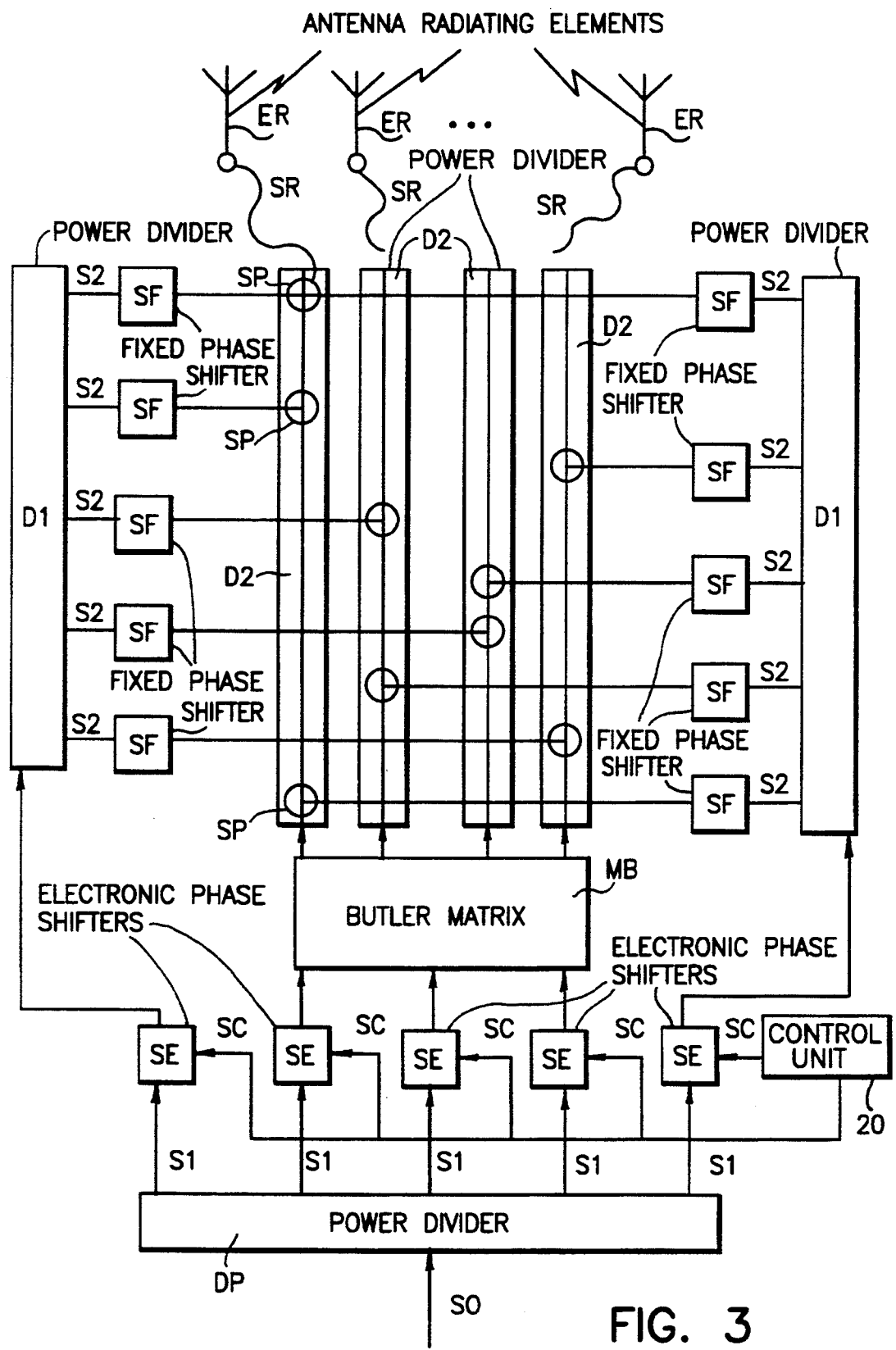
FIG. 3 is a block diagram of a circuit according to the present invention that is connected with the radiating elements of an electronically scanned antenna.

In FIG. 3 there is illustrated a block diagram of the circuit according to the present invention. An oscillating signal SO is applied to the input of a first power divider DP which generates at its outputs a plurality of electrical signals S1. Each of the electrical signals S1 has a precise power ratio with respect to the oscillating signal SO. Disposed at the outputs of the power divider DP are a plurality of electronically controlled phase shifters SE respectively connected to receive outputs S1. Phase shifters SE are designed to produce respective time-varying phase shifts on the plurality of electrical signals S1 in response to respective control signals SC that each of the phase shifters SE receives at its input from a control unit 20. Such phase shifters SE provide the scanning effect. A limited number of electronically controlled phase shifters SE are connected with the inputs of a Butler-matrix MB which has a limited number of outputs with respect to the number of radiating elements of a common electronically scanned antenna.

The complexity of a Butler-matrix depends on the number of inputs and output. By limiting the number of inputs and outputs, the complexity and the number of errors introduced by the matrix is reduced. In general one operates the matrix MB with a number of inputs ranging from 4 to 8 and with a number of outputs ranging from 16 to 36. Therefore, a limited number, 3 or 4 inputs and 8 outputs at most or, still better, 4 outputs are used in such a way that the Butler-matrix has a two level structure.

Disposed at the outputs of those phase shifters SE in FIG. 3 which are not connected with the Butler-matrix MB, respectively are a plurality of power dividers D1. Power dividers D1 generate respective pluralities of electrical signals S2, each having a precise power ratio relative to respective inputs provided thereto. The outputs of the plurality of power dividers D1 are connected to a plurality of fixed phase shifters SF, each providing a precise phase shift. The phase shifters SF are respectively connected to power adders SP.

To summarize, the circuit shown in FIG. 3 comprises a number of electrical or electromagnetic power adders SP equal in number to the number of radiating elements ER of an electronically scanned antenna to which the circuit is connected. The power adders SP respectively receive at an input thereof, one of the outputs of the Butler-matrix MB and a limited number (1, 2, 3...) of outputs of the fixed phase shifters SF, and generate respective radio-frequency sum signals, SR which are to be sent to the radiating elements ER.

In order to obtain better features, it is convenient to place at the outputs of the Butler-matrix MB, a further plurality of power dividers D2, each connected to receive one output of the Butler-matrix, and then connect the outputs of power dividers D2 to the power adders SP according to the end result required for a specific application. Naturally, depending on the application, it will be necessary to fix the number of outputs of each power divider D2 and the power ratio between the individual outputs and the respective input.

Figure 4A:
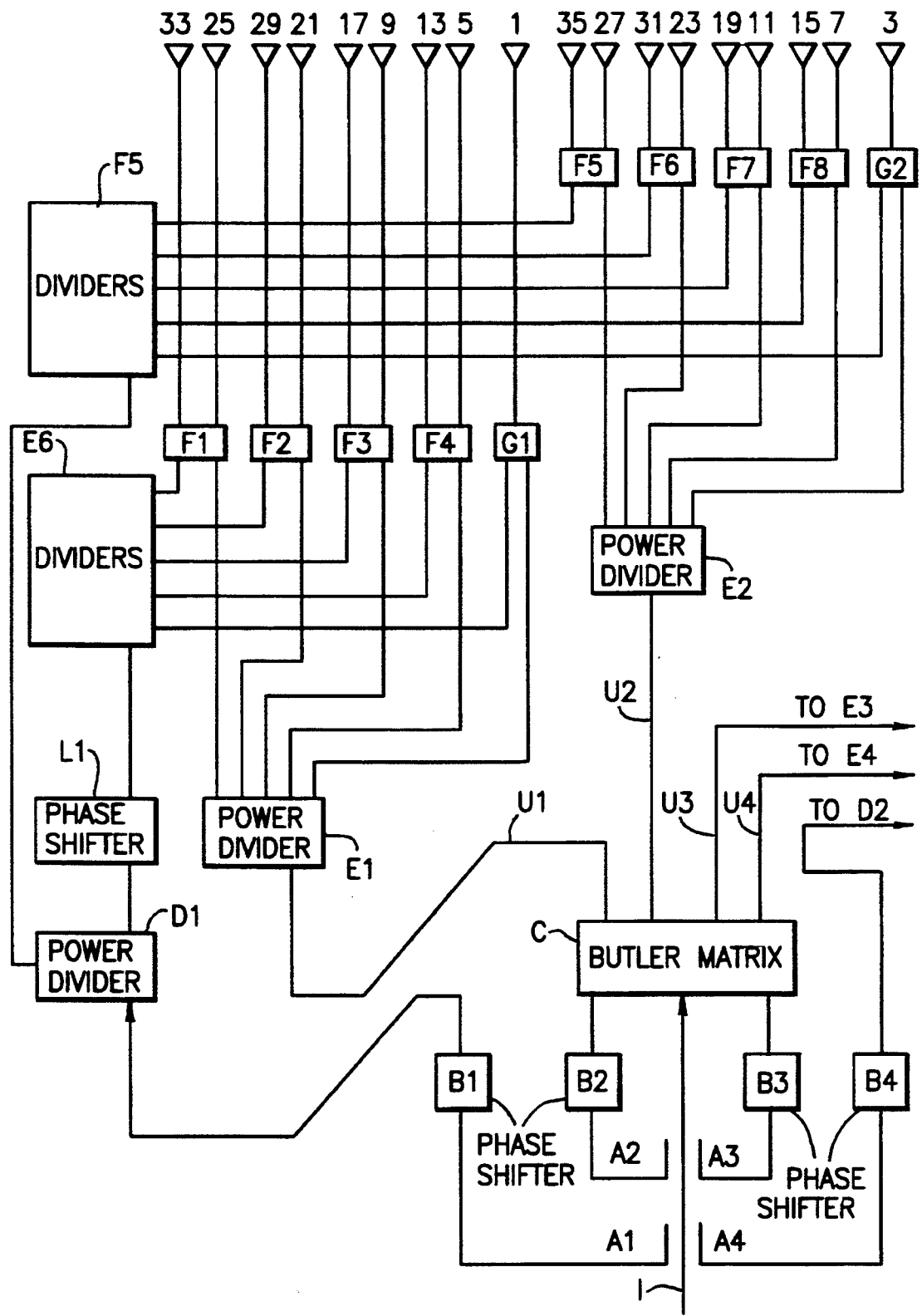
FIGS. 4a and 4b show block diagrams of an embodiment of the circuit, according to the present invention, that is subdivided in two sections and connected with the radiating elements of an electronically scanned antenna of a TACAN system.
Figure 4B:
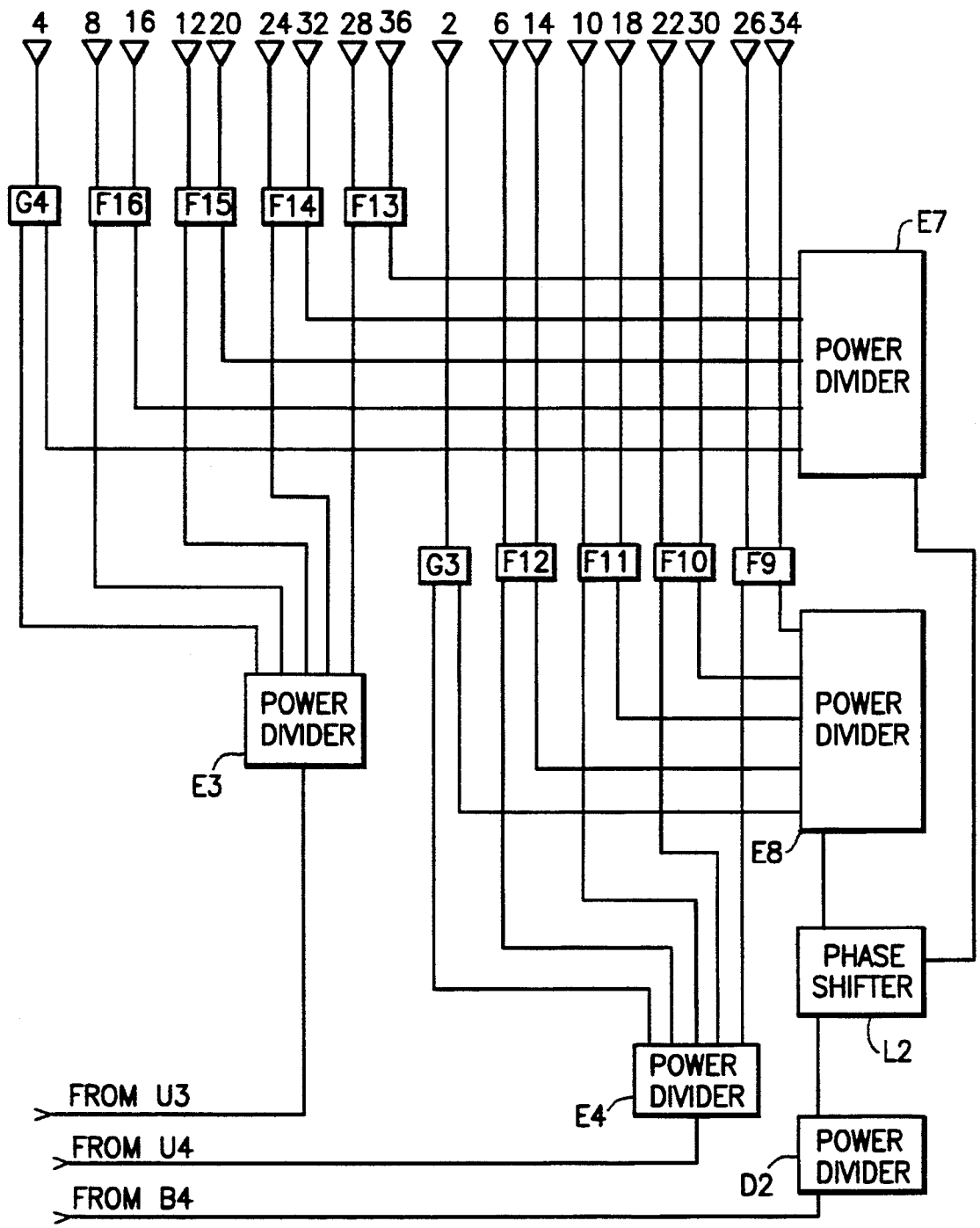

FIGS. 4a and 4b show block diagrams of an embodiment of the circuit according to the present invention subdivided into two sections and connected with the radiating elements ER of an electronically scanned antenna of a TACAN system.

The input I in FIG. 4b (is an oscillating signal, corresponding to the carrier frequency), is applied to a power divider consisting of four electromagnetic couplers A1 to A4 which are coupled directly with the input I. The power ratio is determined by the coupling level of the individual couplers A1–A4.

Signals picked up from the four couplers A1, A2, A3, A4 are fed to the input of four phase shifters B1, B2, B3, B4 respectively.

The outputs from couplers A1, A2, A3 and A4 that are connected with phase shifters B1 and B4 are first and second sidebands related to a 15 Hz modulation signal, while outputs B2 and B3 are first and second sidebands related to a 135 Hz modulation signal, respectively. The levels of the signals from couplers A1 to A4 establish the modulation index.

The four phase shifter B1 to B4 are electronically controlled and apply suitable phase shifts to the four signals picked up from couplers A1 to A4 thus obtaining the effect that the radiation pattern rotates fifteen revolutions per second. Such phase shifters generally comprise switched-line phase shifters whose switching is operated with PIN diodes controlled by digital signals, e.g., four bits, coming from control unit 20.

Signals related to the carrier input I, and to the two 135 Hz sidebands, appearing at the output of phase shifters B2 and B3, are provided at the inputs of a 3×4 Butler-matrix C, more precisely with input phase modes −1, 0, and +1.

The two signals at the output of phase shifters B1 and B4, are related to the first and second 15 Hz sidebands, and are parallelly sent respectively to two power dividers D1 and D2 whose function is to divide the input power into two equal parts; the power dividers are simply realized with electrically connected microstrip structures.

Both the output signals from the power dividers D1 and D2, (related to the first and second 15 Hz sidebands) and the signals from the outputs of the Butler-matrix C (related to the carrier with the suitably overlapped first and second 135 Hz sidebands) are divided by nine and, suitably combined, and are fed to four groups of nine radiating elements, in a way which will become clearer in the following paragraphs.

The outputs of divider D1, which represent the first 15 Hz sideband, are transmitted through shifter L1, two dividers E5 and E6 blocks F1 to F8 blocks G1 and G2, and then are distributed with the same amplitude to the eighteen odd-numbered outputs among outputs 1–35, the eighteen odd-numbered outputs have a progressively increasing phase of 20 degrees to generate the phase mode +1 necessary for the 15 Hz modulation.

In a similar way the outputs of divider D2, shown in FIG. 4b which represent the second 15 Hz sideband, are processed through phase shifter L2, two dividers E7 and ES, blocks F9 to F16, blocks G3 and G4, and are then distributed with the same amplitude over the nine outputs of the circuit, which is the subject of the present invention, designated by 1, 5, 9, 13, 17, 21, 25, 29 and 33 of FIG. 4a.

Similarly, outputs U2, U3, U4 of the Butler-matrix C in FIG. 4a are fed to a groups of nine outputs which have an incremental index stepped up by four.

Dividers E1 to E8 are divide-by-five unbalanced power dividers with respective outputs having the ratios 2/9, 2/9, 2/9, 2/9 and 1/9. Obviously, outputs having a ratio equal to 2/9 are respectively connected with an F block while outputs having a ratio of 1/9 are respectively connected with a G block.

Figure 5:
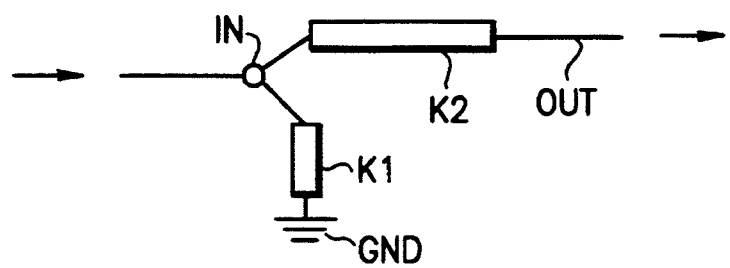
FIG. 5 shows a schematic structure of the phase shifter according to the present invention.

In FIG. 5 there is illustrated ac schematic structure of a phase shifter according to the present invention suitable for attaining the above-mentioned objects.

A microstrip structure K2 is responsible for the preselected phase shift at a specified frequency (central frequency of an operation band of the phase shifter itself); one of the ends of the microstrip K2 is connected with an output OUT, the other end of the microstrip K2 is connected to an input IN and to another microstrip structure K1. The other end of structure K1 is connected to a ground GND potential. Structure K2 provides a phase shift that increases with frequency and therefore is not as constant as one would like; microstrip structure K1, on the contrary, has a phase shift which decreases with frequency, since one of its ends is connected to ground. The overall effect is to compensate the two effects. If the branch K1 is then tuned to a fourth of the wavelength corresponding to the preselected frequency, the compensation is still better.

Shapes and dimensions of the two microstrip structures K1 and K2 are extremely variable and depend on the particular application and must be chosen on the basis of laboratory experiments.

Figure 6:
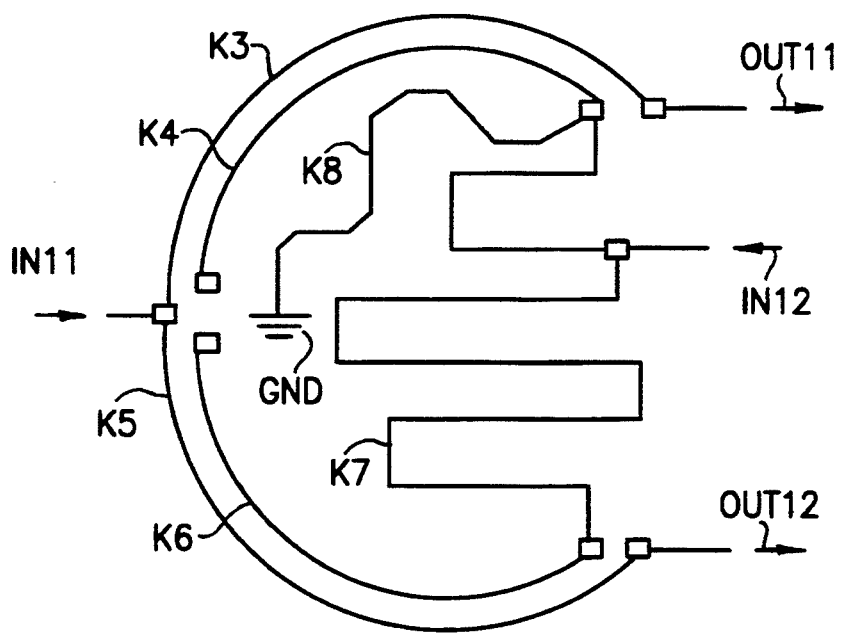
FIG. 6 shows a physical structure of an embodiment of a pair of phase shifters according to the present invention integrated together with two electromagnetic combiners.

In FIG. 6 there is illustrated a physical structure of an embodiment of a pair of phase shifters operating in accordance with the principle of the phase shifter of FIG. 5 which are integrated together with two electromagnetic combiners. Such a structure is advantageously used for realizing blocks F1–16 in FIGS. 4a and 4b and the whole structure is realized through the use of arcs and branches of microstrips.

The structure shows in FIG. 6 has two inputs IN11 and IN12, and two outputs OUT11 and OUT12. The structure in FIG. 6 is formed by coupling two circumferential arcs K3 and K5 together. The free ends of the arcs K3 and K5 are coupled with outputs OUT11 and OUT12. The microstrip K7 is disposed between said free ends of the arcs K3 and K5. Microstrip K7 is formed by square wave sections that are not electrically connected with the two arcs K3 and K5. At the ends of structure K7 are two further circumferential arcs K4 and K6 which are positioned to be parallel to arcs K3 and K5 respectively. The structure shown in FIG. 6 creates two electromagnetic couplings which provide consequent power summation.

Structure K7 has a tap connected to input IN12 and to the two square wave sections so that they act as phase shifters and the amount of the phase shift depends naturally on the exact shape and dimensions of the microstrip and on the choice of the tap. Then, in order to improve the frequency compensation, there is provided a further microstrip structure K8 electrically connected, at one end, with arc K4 and with structure K7 in the area of output OUT11. K8 is grounded at the other end thereof. The exact form and dimensions of a structure as shown in FIG. 6 are obtained based on experiments that try to obtain phase shift constancy in the operating band of the phase shifter. Naturally, innumerable variations could result from such experiments but the end results will still be based upon the same principle.

Figure 7:
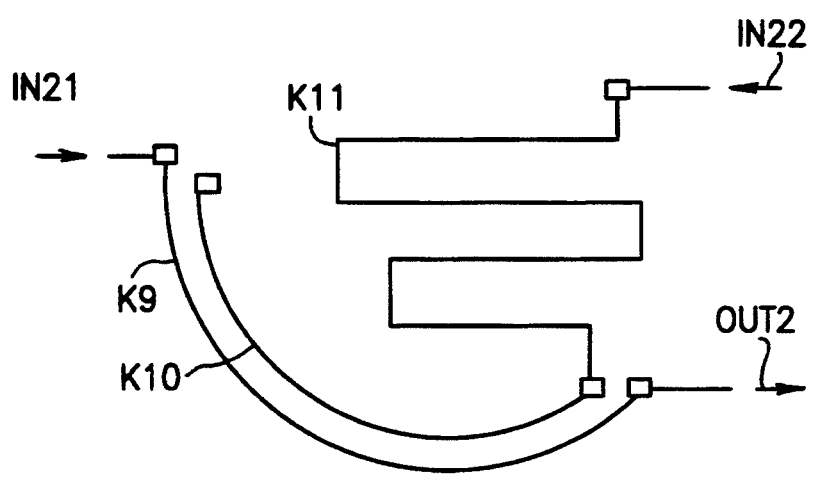
FIG. 7 shows a physical structure resulting from the integration of a conventional phase shifter and an electromagnetic combiner, which can be advantageously used in the circuit according to the present invention.

In FIG. 7, there is shown a physical structure, resulting from the integration of a conventional phase shifter with an electromagnetic combiner, which can be advantageously used in the circuit according to the present invention, in particular to realize blocks G1, G2, G3 and G4.

As can be seen from FIG. 7. FIG. 7 corresponds to a portion of the structure shown in FIG. 6. FIG. 7 has two inputs IN21 and IN22 and one output OUT2. Input IN21 is connected to one end of a circumferential arc K9, the other end of arc K9 is connected to output OUT2. Disposed in parallel with circumferential arc K9 is a further circumferential arc K10 electromagnetically coupled therewith.

Connected with the end of arc K10 at the output OUT2, is a structure K11 formed of a square wave section. Input IN22 is connected with the other end of structure K11.

If the frequency compensation provided by a conventional phase shifter is not sufficient, it is possible, of course, to add a further microstrip structure like K11 of FIG. 5.

Various changes and modifications may be made, and features described in connection with any one of the embodiments may be used with any of the others, within the scope of the inventive concept.

We claim:

1. A circuit for generating RF signals for an electronically scanned antenna, said antenna comprising a number of independent radiating elements, said circuit receiving an oscillation signal at an input thereof, and generating a plurality of RF signals equal in number to the number of said plurality of radiating elements, said plurality of RF signals differing from each other in phase and amplitude, said circuit comprising:

a first power divider (DP) for receiving said oscillating signal at an input thereof, and for generating a plurality of first electrical output signals (S1) at a plurality of outputs thereof, each of said plurality of first electrical output signals (S1) having a precise power ratio relative to said oscillating signal;

a plurality of electronically controlled phase shifters (SE), respectively connected to receive a different one of said plurality of first electrical output signals (S1) output by said first power divider (DP), each of said plurality of electronically controlled phase shifters (SE) providing a respective time-varying phase shift to each respective one of said plurality of first electrical output signals (S1) responsive to a control signal (SC);

a Butler-matrix (MB) having a plurality of inputs connected to receive a respective output from a limited number, less than all, of said plurality of electronically controlled phase shifters, said Butler-matrix (MB) having a smaller number of outputs than said number of said plurality of radiating elements;

a plurality of second power dividers (D1), each second power divider having an input connected to receive an output of a respective one of said plurality of electronically controlled phase shifters (SE)

that is not connected to said Butler-matrix (MB), each of said plurality of second power dividers (D1) generating at a plurality of outputs thereof, a plurality of second electrical output signals (S2) such that each of said plurality of second electrical output signals (S2) has a precise power ratio relative to the signal provided at the input of each of said plurality of second power dividers;

a plurality of fixed phase shifters (SF) respectively connected to said plurality of second power dividers; and a plurality of power adders (SP), equal in number to said number of said plurality of radiating elements, each of said plurality of power adders having an input connected to receive at least one of the outputs of said Butler-matrix and to receive at least one output of said plurality of fixed phase shifters, each of said plurality of power adders providing at an output thereof, a power adder output signal that is provided to a respective one of said number of radiating elements.

2. The circuit according to claim 1, further comprising:

an additional plurality of power dividers (D2), each additional power divider being connected to receive one of said outputs of said Butler-matrix (MB); and wherein:

said plurality of power adders (SP) are connected to receive an output of a respective one of said additional plurality of power dividers (D2); and at least one of said plurality of electronically controlled phase shifters (SE) is coupled between said Butler-matrix (MB) and said first power divider (DP) so as to directly receive one of said plurality of outputs of said first power divider (DP).

3. The circuit according to claim 2, wherein said oscillating signal is also directly coupled to one of said plurality of inputs of said Butler-matrix.

4. The circuit according to claim 1, wherein:

said first power divider (DP) includes a plurality of electromagnetic couplers (A1–A4 of FIG. 4b) that generate a plurality of outputs that are electrically coupled to be said plurality of first electrical output signals of said first power divider; and a power ratio of said first power divider is determined by a coupling level of said plurality of electromagnetic couplers (A1–A4).

5. The circuit according to claim 1, wherein each of said plurality of electronically controlled phase shifters (SE) comprises a switched-line phase shifter that is respectively switchable by a PIN diode controlled by said control signal.

6. The circuit according to claim 1, wherein said Butler-matrix comprises a two-level matrix.

7. The circuit according to claim 1, wherein each of said plurality of second power dividers (D1) comprises a plurality of electrically connected microstrip structures.

8. The circuit according to claim 7, wherein each of said plurality of power adders (SP), produces one of said power adder output signals by adding one of said outputs of said Butler-matrix (MB), to an output provided by at least one of said fixed phase shifters, each of said power adders (SP) being directly coupled with an electrical connection of a microstrip structure.

9. The circuit according to claim 1, wherein:

said power adders (SP) are connected to form a plurality of pairs of power adders;

each respective pair of said plurality of pairs of power adders providing RF signals to a respective pair of a plurality of pairs of said radiating elements;

a first pair of said plurality of pairs of said power adders being connected to a first pair of a plurality of pairs of said fixed phase shifters, for providing a pre-established phase shift to said power adder output signals provided by said first pair of power adders; and each pair of said plurality of pairs of said phase shifters having a common microstrip structure.

* * * * *